United States Patent [19]
Meyer-Ebrecht

[11] 4,015,209
[45] Mar. 29, 1977

[54] CARRIER WAVE COMPENSATOR WITH INTERFERENCE SUPPRESSION CIRCUIT MEANS
[75] Inventor: Dietrich Meyer-Ebrecht, Hamburg, Germany
[73] Assignee: U.S. Philips Corporation, New York, N.Y.
[22] Filed: Apr. 26, 1976
[21] Appl. No.: 680,457

Related U.S. Application Data
[63] Continuation of Ser. No. 497,066, Aug. 13, 1974, abandoned.

[30] Foreign Application Priority Data
Sept. 14, 1973 Germany .......................... 2341066

[52] U.S. Cl. .......................... 328/162; 324/DIG. 1;
324/65 R; 324/99 R; 328/1; 328/167
[51] Int. Cl.² .................. H04B 1/10; G01R 27/02;
G01R 17/06
[58] Field of Search ............... 307/229, 308; 328/1,
328/162, 165–167; 324/DIG. 1, 65 R, 99 R;
73/88.5

[56] References Cited
UNITED STATES PATENTS

| 3,308,383 | 3/1967 | Kinoshita et al. | 328/1 |
| 3,510,696 | 5/1970 | Bargen et al. | 307/308 |
| 3,550,013 | 12/1970 | Gurol | 328/1 |
| 3,824,479 | 7/1974 | Alger | 328/1 |
| 3,845,385 | 10/1974 | Ebrecht | 324/65 R |

Primary Examiner—Stanley D. Miller, Jr.
Attorney, Agent, or Firm—Frank R. Trifari; Bernard Franzblau

[57] ABSTRACT

A carrier wave compensator includes a novel sampling filter connected between a null amplifier and a compensation potentiometer to suppress interference voltages without deteriorating the dynamic response of the system. The sampling filter includes a multiplier, an integrator and a sample and hold circuit which is reset during zero passages of the carrier wave.

5 Claims, 1 Drawing Figure

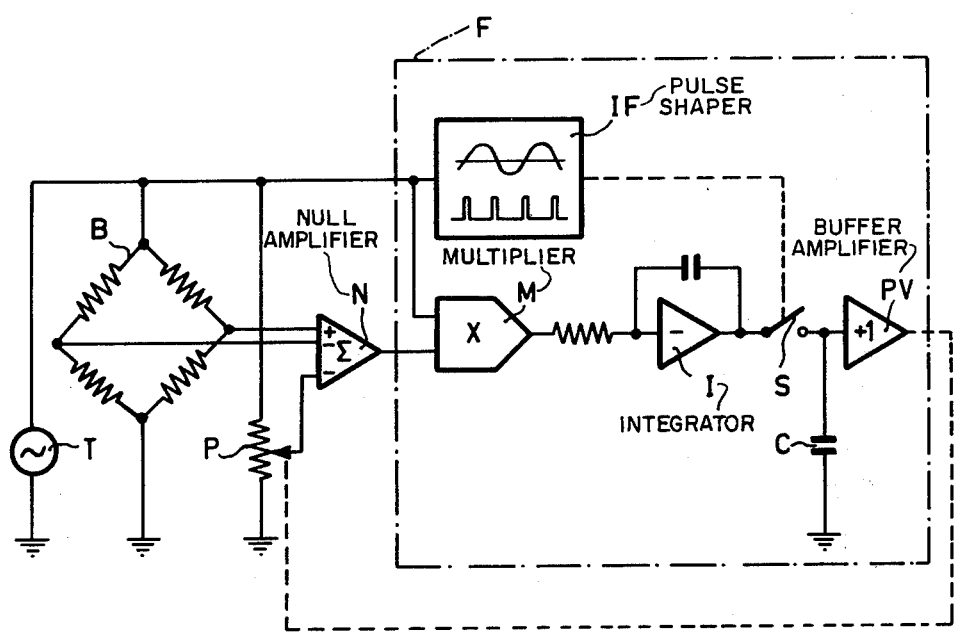

CARRIER WAVE COMPENSATOR WITH INTERFERENCE SUPPRESSION CIRCUIT MEANS

This is a continuation of application Ser. No. 497,066, filed Aug. 13, 1974, now abandoned.

The invention relates to a circuit arrangement for suppressing interference voltages in carrier wave compensators, which arrangement comprises a measuring bridge supplied by a carrier wave supply source, a null amplifier and a compensation arrangement adjusted by the null amplifier for the compensation of the bridge-unbalance to be measured.

Measuring value converters are known, e.g. from German patent specification 1,591,988, in which the unbalance of a resistance bridge, for example a strain-gauge measuring bridge, is converted into a signal frequency variation. In such arrangements the frequency of a sinewave oscillator is controlled by varying a circuit parameter. Simultaneously, a signal is derived from said circuit parameter which compensates for the unbalance of the input element of the converter, i.e. of the resistance bridge. In a manner similar to that used in automatic carrier wave compensators, compensation is achieved by means of a control circuit which controls the said circuit parameter.

In said known automatic carrier wave compensators the inertia of the electro-mechanical elements, such as for example indicating or recording elements, or the slow response of the amplitude controlled sinewave oscillator, determines the dynamic behaviour of the compensation process. The control circuit in the compensator generally has an integrating effect with a very large time constant. Interference voltages in the output signal of the null amplifier — such as reactive components, harmonics and noise voltages — are suppressed by the controller, which also functions as a low-pass filter.

Frequently it is desirable to substantially extend the dynamic response of the compensator. This is for example required if in a measuring value converter of the above-mentioned type an oscillator with sampling amplitude control is employed with a very fast response, as described for example in the published German patent application 2,001,451. It is then not possible to simply reduce the time constant of the integrating controller in the compensator. This would impair the filtering action of the controller, while the said interference components would adversely affect the control element.

It is an object of the present invention to provide a circuit arrangement for suppressing interference voltages in the output signal of the null amplifier without, or substantially without, deteriorating the dynamic response of the control circuit of the compensator.

According to the invention this is achieved by providing a sampling filter between the null amplifier and the compensation arrangement. This filter consists of a multiplier, an integrator, a sampling switch, a pulse shaper circuit, and a hold capacitor connected to a buffer amplifier. The multiplier has a first input connected to the output of the null amplifier and a second input to the supply source. The output of the multiplier is connected to the integrator. The output of the integrator is periodically connected, by means of the sampling switch, to the hold capacitor so that the buffer amplifier delivers a control signal to the compensation arrangement. The pulse shaper circuit is connected to the supply source for generating short control pulses during the zero passages of the carrier wave for closing the sampling switch periodically for short periods.

The invention will be described in more detail with reference to the accompanying drawing.

A carrier wave source T supplies a sine-wave signal $U_0 \sin\omega_0 t$ to a resistance bridge B (e.g. a strain gauge measuring bridge) and a potentiometer circuit P, said potentiometer producing a compensation voltage. The bridge output voltage and the compensation voltage are applied to the inputs of corresponding polarity of a null amplifier N. The null amplifier may comprise a Signetics dual operational amplifier designated 5558 or $\mu$A747. One amplifier has its inverting and noninverting input terminals connected to the output terminals of the bridge B. The second amplifier has its input terminals connected to the arm of potentiometer P and to the output terminal of the first amplifier. The first amplifier operates as a differential amplifier and the second amplifier as a comparator. The output signal of the second amplifier is coupled to one input of the multiplier M. The output voltage of said amplifier is processed into a control signal via a sampling filter F, which signal controls the potentiometer circuit P. The actual sampling filter consists of a conventional multiplier M, an integrator I of known construction, a sampling switch S which is controlled by a well known pulse shaper circuit IF, a hold capacitor C and a buffer amplifier PV with a very high ohmic input.

The multiplier M operates as a demodulator in that it multiplies the output signal of the null amplifier N by the carrier wave signal $U_0 \sin\omega_0 t$. The output signal of the null amplifier generally consists of a mixture of the useful signal $\sin\omega_0 t$, which only becomes zero in the case of compensation, with interference signals $\cos\omega_0 t$ (owing to capacitive asymmetry of bridge and supply leads), $\sin n.\omega_0 t$ and $\cos n.\omega_0 t$ (owing to non-linearities of the electronic circuit), and $\sin(\omega t+\phi)$ (external disturbing influences of arbitrary frequency and input noise of the null amplifier). When said signals are multiplied by the carrier wave signal $U_0 \sin\omega_0 t$, only the useful signal results in a d.c. component at the multiplier output — in contrast to the commonly used switching modulators. Thus, this results in a variation of the average output voltage of the integrator. The mixing products of the inteference components are superimposed on said voltage. The output voltage of the integrator should be sampled precisely at the zero passages of the sinewave carrier voltage. For this purpose the circuit IF derives the required short control pulse for the sampling switch S from the carrier wave signal $U_0 \sin\omega_0 t$ during each zero passage thereof. FIG. 1 of U.S. Pat. No. 3,381,226 shows a zero crossing detector that could be used to implement box IF.

The operation of the sampling filter can be explained as follows. The output signal of the filter (the control signal) assumes a constant value in the time intervals between two sampling pulses, i.e. each time for the duration of half a carrier wave period. The variations of the average d.c. value at the output of the integrator caused by the useful signal component in the null amplifier signal are followed stepwise by the control signal. For the controller function this means that in addition to the desired integrating action only a dead-time factor of ¼ of the carrier wave period may be introduced, so that the compensation control circuit can reach control times of some carrier wave periods. On the other hand, for the function of interference-component filter, this means that alternating components in the output signal of the multiplier with frequencies that are multiples of the scanning frequency ($2.\omega_0$) are fully rejected. Therefore, components which are odd multiples of the carrier frequency are filtered out of the null amplifier signal, i.e. especially the strong components caused by capacitive bridge asymmetry and symmetrical non-linearities. Owing to the fixed phase-relationship between the sampling pulse and the demodulating signal — at the sampling instant the multiplier output signal is always zero, independent of all interference components — an attenuation of high-frequency interference components is obtained which is substantially greater than the filter action of the integration element alone. This is essential because the subsequent sample-hold element would transfer interference signals of frequencies above the scanning frequency to a frequency range below the scanning frequency, the interference signals being attenuated once more in accordance with the known series functions according to Fourier.

What is claimed is:

1. A circuit arrangement for suppressing interference voltages in carrier wave compensators comprising, a measuring bridge, a carrier wave supply source coupled to the measuring bridge input terminals, a null amplifier coupled to the bridge output terminals, a compensation arrangement coupled to an input of the null amplifier and adjusted by the output of the null amplifier for the compensation of the bridge-unbalance to be measured, a sampling filter connected between the null amplifier output and the compensation arrangement, said sampling filter including a multiplier, an integrator, a sampling switch, a pluse shaper circuit and a hold capacitor connected to a buffer amplifier, means connecting a first input of the multiplier to the output of the null amplifier and a second multiplier input to the supply source, means connecting the output of the multiplier to the integrator, means including the sampling switch for connecting the output of the integrator periodically to the hold capacitor so that the buffer amplifier delivers a control signal to the compensation arrangement, and means connecting the pulse shaper circuit to the supply source for generating short duration control pulses during the zero passages of the carrier wave for closing the sampling switch periodically for short periods of time.

2. An electrical measuring system with means for suppressing interference voltages comprising, a source of AC supply voltage, a measuring bridge having input terminals coupled to the AC supply source, an amplifier having input means coupled to the output terminals of the measuring bridge, and compensation feedback means coupled to the output of said amplifier for deriving a compensation signal for compensating the bridge unbalance to be measured, said compensation feedback means comprising, a multiplier having first and second inputs coupled to the output of the amplifier and the AC supply source, respectively, an integrator with its input coupled to the output of the multiplier, and a sample and hold circuit coupled to the output of the integrator and comprising a capacitor coupled to the integrator output via a sampling switch and pulse generator means coupled to the AC supply source for generating short duration control pulses during the zero crossover passages of the AC supply and which control pulses periodically control the operation of the sampling switch.

3. A measuring system as claimed in claim 2 wherein said compensation feedback means further comprises, a variable impedance element coupled to the AC supply source, and a buffer amplifier coupled to the capacitor for deriving a compensation control signal for the control of the variable impedance element.

4. A measuring system as claimed in claim 2 wherein said multiplier, said integrator, said sampling switch and said capacitor are connected in cascade, the pulse generator control pulses being operative to close the sampling switch to sample the integrator output voltage at the zero crossover region of the AC supply thereby to derive a compensation control signal across the capacitor.

5. A measuring system as claimed in claim 4 wherein said compensation feedback means further comprises a variable impedance element coupled to the amplifier input means, and means for varying the impedance of said variable impedance element as a function of the compensation control signal.

* * * * *

UNITED STATES PATENT AND TRADEMARK OFFICE
CERTIFICATE OF CORRECTION

PATENT NO. : 4,015,209
DATED : March 29, 1977
INVENTOR(S) : DIETRICH MEYER-EBRECHT It is certified that error appears in the above-identified patent and that said Letters Patent are hereby corrected as shown below:

IN THE TITLE PAGE

Section [30], "Sept. 14, 1973" should be --August 14, 1973--

IN THE CLAIMS

Claim 1, line 12, "pluse" should be --pulse--.

Signed and Sealed this

Second Day of May 1978

[SEAL]

Attest:

RUTH C. MASON
Attesting Officer

LUTRELLE F. PARKER
Acting Commissioner of Patents and Trademarks